(12) United States Patent
Tanaka

(10) Patent No.: US 11,711,239 B2
(45) Date of Patent: Jul. 25, 2023

(54) COMMUNICATION SYSTEM, VPN TERMINATION DEVICE, AND STORAGE MEDIUM

(71) Applicant: Takehiro Tanaka, Kanagawa (JP)

(72) Inventor: Takehiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 17/445,846

(22) Filed: Aug. 25, 2021

(65) Prior Publication Data
US 2022/0070023 A1     Mar. 3, 2022

(30) Foreign Application Priority Data

Sep. 1, 2020   (JP) ................................ 2020-146829

(51) Int. Cl.
*H04L 12/46*     (2006.01)
*H04L 41/084*    (2022.01)
*H04L 41/0806*   (2022.01)

(52) U.S. Cl.
CPC ...... *H04L 12/4641* (2013.01); *H04L 41/0806* (2013.01); *H04L 41/0846* (2013.01)

(58) Field of Classification Search
CPC . H04L 12/4641; H04L 45/18; H04L 63/0272; H04L 63/0281; H04L 41/0895
See application file for complete search history.

(56) References Cited

U.S. PATENT DOCUMENTS

| | | | | |
|---|---|---|---|---|
| 6,079,020 A | * | 6/2000 | Liu ........................ | H04L 41/22 709/223 |
| 6,092,200 A | * | 7/2000 | Muniyappa ......... | H04L 63/0823 713/150 |
| 6,701,358 B1 | * | 3/2004 | Poisson ............... | H04L 12/4675 709/224 |
| 7,373,661 B2 | * | 5/2008 | Smith ................. | H04L 63/0272 713/1 |
| 10,721,235 B2 | | 7/2020 | Iwashita | |
| 2002/0124090 A1 | * | 9/2002 | Poier ..................... | H04L 63/061 709/228 |
| 2003/0069958 A1 | * | 4/2003 | Jalava ................. | H04L 12/4641 709/223 |
| 2014/0082719 A1 | * | 3/2014 | Persson ................ | H04L 12/462 726/15 |

(Continued)

FOREIGN PATENT DOCUMENTS

| | | |
|---|---|---|
| JP | 2002-261829 | 9/2002 |
| JP | 2011-055305 | 3/2011 |
| JP | 6838343 | 3/2021 |

*Primary Examiner* — Madhu Woolcock
(74) *Attorney, Agent, or Firm* — IPUSA, PLLC

(57) ABSTRACT

A communication system includes multiple VPN termination devices that perform a first VPN communication and a configuration server that configures the first VPN communication. Each of the VPN termination devices includes a first processor programmed to implement a configuration information receiver that receives configuration information for the first VPN communication sent from the configuration server, a communication controller that controls the first VPN communication based on the configuration information, and a first VPN communication unit that performs the first VPN communication with another one of the VPN termination devices according to a control of the communication controller.

9 Claims, 15 Drawing Sheets

(56) References Cited

U.S. PATENT DOCUMENTS

2016/0087840 A1* 3/2016 Miller .................... H04L 45/02
709/221
2016/0359811 A1* 12/2016 Chan .................. H04L 12/6418

* cited by examiner

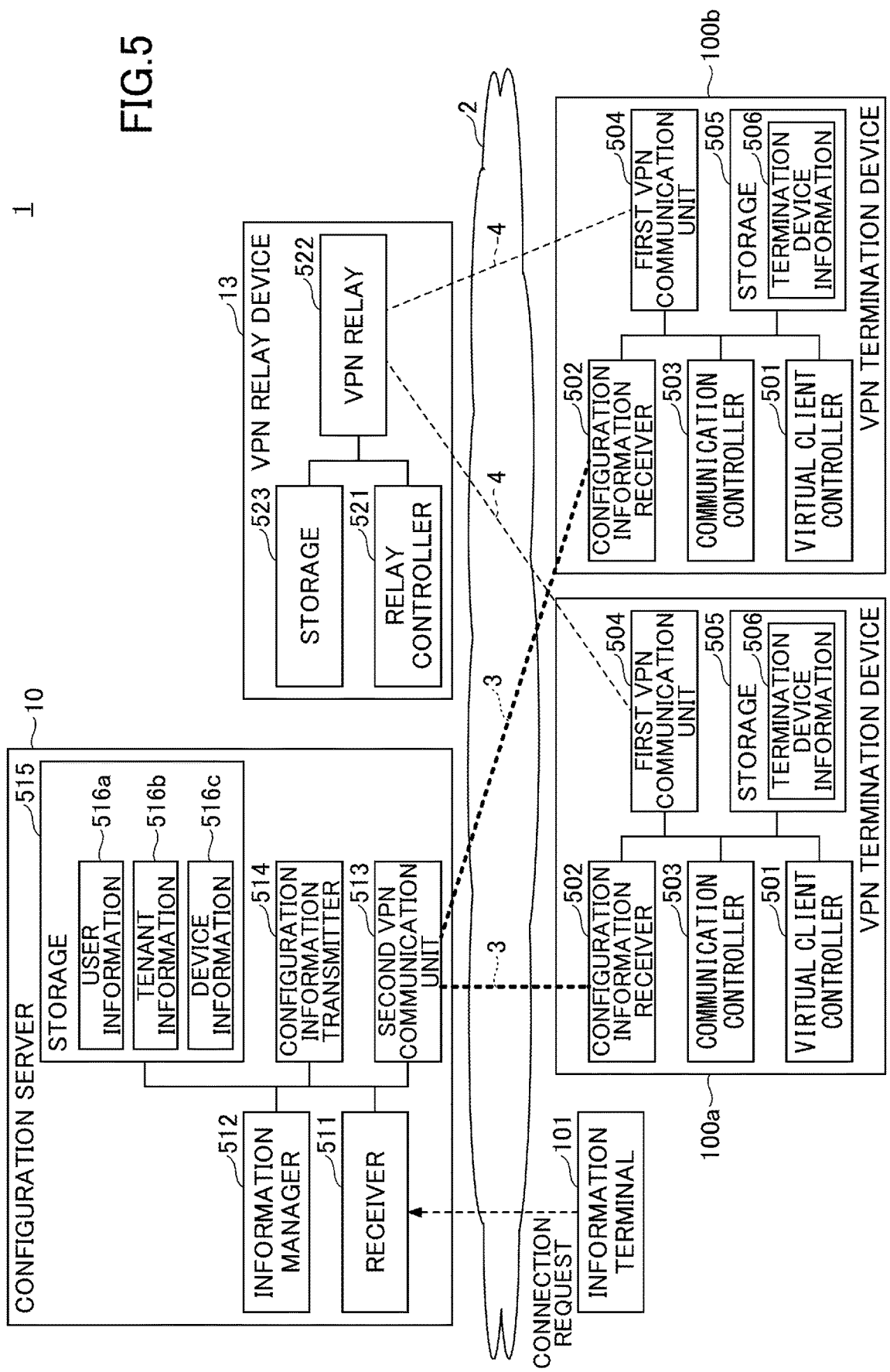

| USER ID | AUTHENTICATION INFORMATION | TENANT ID | ... |
|---|---|---|---|
| U0001 | aaaaa | T0001 | ... |
| U0002 | bbbbb | T0001 | ... |
| ... | ... | ... | ... |

| TENANT ID | TERMINATION DEVICE ID (DEDICATED) | RELAY DEVICE URL | TERMINATION DEVICE ID (SHARED) | ... |
|---|---|---|---|---|
| T0001 | PG0001 | wss://~/12345 | SG0001 | ... |
| T0002 | PG0002<br>PG0003 | wss://~/987675 | – | ... |
| ... | ... | ... | ... | ... |

| TERMINATION DEVICE ID | INTERFACE | ATTRIBUTE | IP ADDRESS | ... |
|---|---|---|---|---|
| SG0001 | ethws0 | SHARED | 192.0.2.10 | ... |
| PG0001 | ethws1 | DEDICATED | 102.0.2.11 | ... |
| ... | ... | ... | ... | ... |

| TERMINATION DEVICE ID (OWN DEVICE) | TERMINATION DEVICE (PARENT) URL | IP ADDRESS OF PARENT CLIENT | IP ADDRESS OF CHILD CLIENT |
|---|---|---|---|
| PG0001 | wss://~/67890 | 102.0.2.11 | 102.0.3.1 |

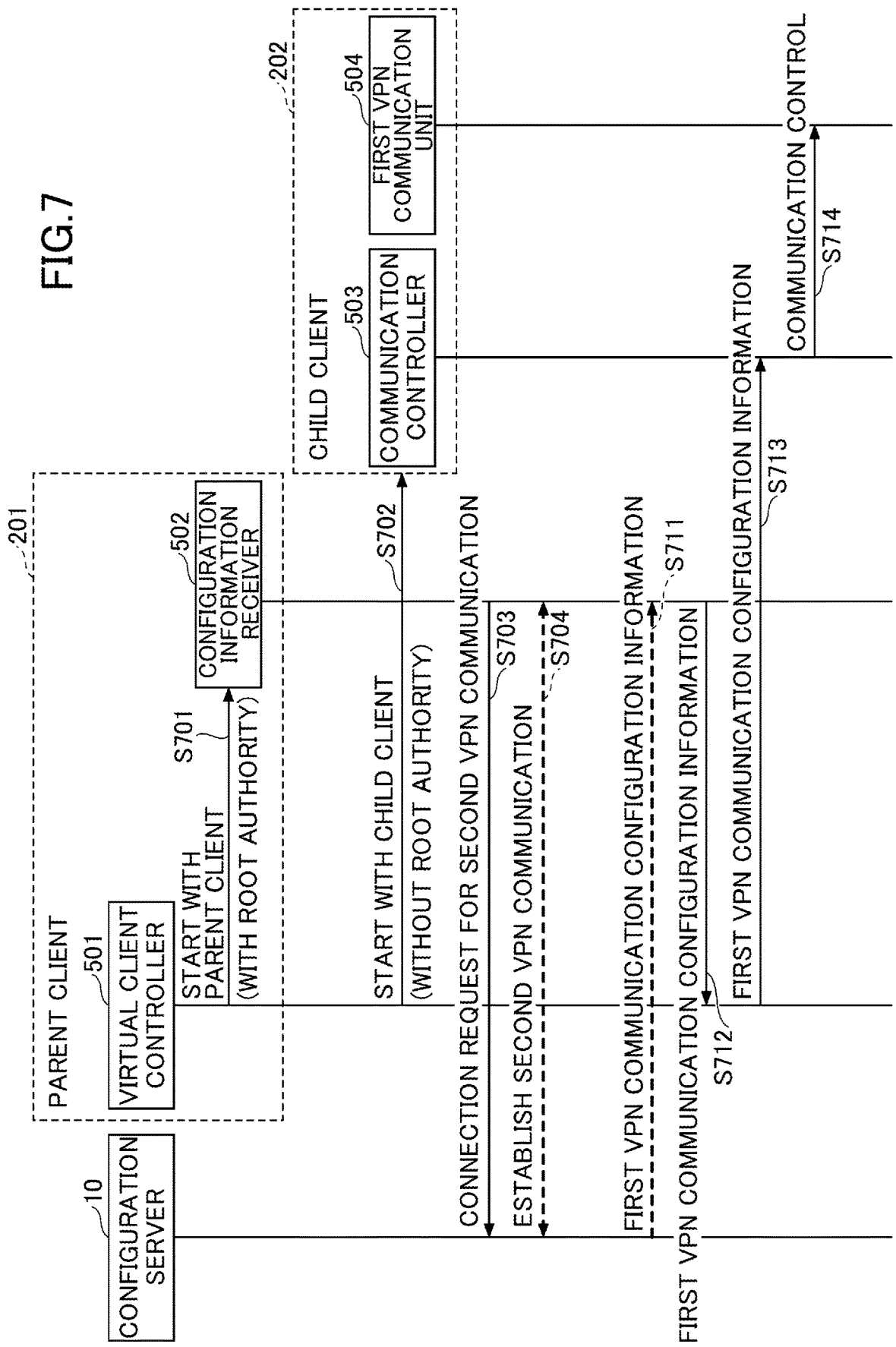

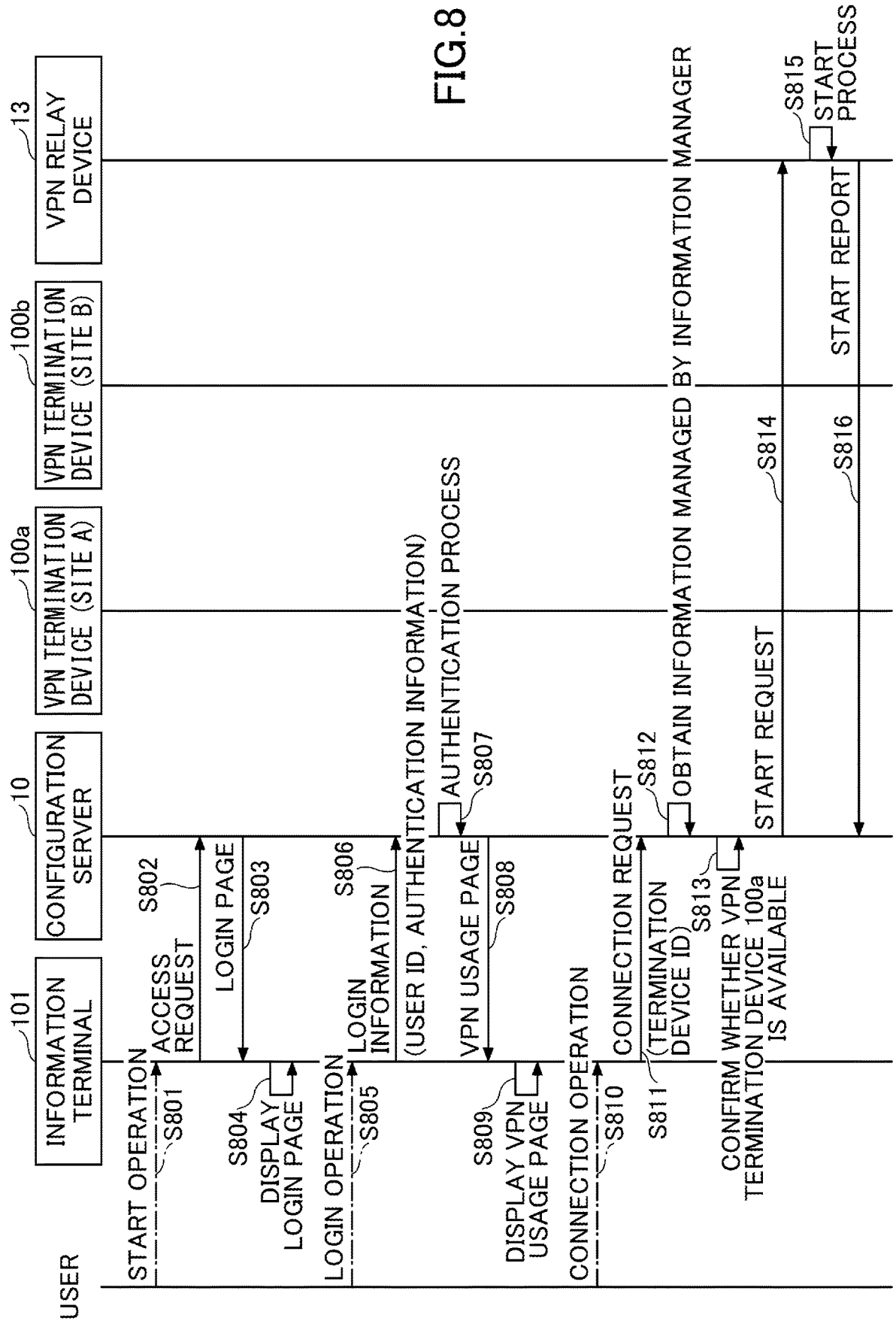

COMMUNICATION SYSTEM, VPN TERMINATION DEVICE, AND STORAGE MEDIUM

CROSS-REFERENCE TO RELATED APPLICATION

The present application claims priority under 35 U.S.C. § 119 to Japanese Patent Application No. 2020-146829, filed on Sep. 1, 2020, the contents of which are incorporated herein by reference in their entirety.

BACKGROUND OF THE INVENTION

1. Field of the Invention

An aspect of this disclosure relates to a communication system, a VPN termination device, and a storage medium.

2. Description of the Related Art

In recent years, the need for a remote connection environment using a virtual private network (VPN) communication has increased due to the reform of work styles and the spread of work from home.

As a related technology, a VPN configuration system is known (see, for example, Japanese Unexamined Patent Publication No. 2011-055305). The VPN configuration system simplifies the configuration of multiple VPN termination devices and transfer control devices for VPN communications.

SUMMARY OF THE INVENTION

According to an aspect of this disclosure, a communication system includes multiple VPN termination devices that perform a first VPN communication and a configuration server that configures the first VPN communication. Each of the VPN termination devices includes a first processor programmed to implement a configuration information receiver that receives configuration information for the first VPN communication sent from the configuration server, a communication controller that controls the first VPN communication based on the configuration information, and a first VPN communication unit that performs the first VPN communication with another one of the VPN termination devices according to a control of the communication controller.

BRIEF DESCRIPTION OF THE DRAWINGS

FIG. 5 is a drawing illustrating an example of a functional configuration of a communication system according to a first embodiment;

FIGS. 6A through 6D are drawings illustrating examples of information managed by the communication system according to the first embodiment;

FIG. 7 is a sequence chart illustrating an example of a process performed when a VPN termination device is started according to the first embodiment;

FIG. 8 is a sequence chart illustrating an example of a process of starting a first VPN communication according to the first embodiment;

DESCRIPTION OF THE EMBODIMENTS

In a communication system where configuration information of multiple VPN termination devices used for VPN communications is set via a network from a configuration server for configuring the VPN communications, a loop may occur in the network and communication problems may occur due to duplicated unnecessary packets. For this reason, in the related-art technologies, for example, packet control rules for selecting and discarding packets are set in the VPN termination devices so that a loop does not occur in the network.

However, the setting of the packet control rules requires a high level of expertise and a large amount of time. Therefore, with the related-art communication systems, it is troublesome to control the network to prevent the occurrence of a loop.

An aspect of this disclosure makes it easier to prevent the occurrence of a loop in a network in a communication system where configuration information of multiple VPN termination devices are set by a configuration server via the network.

Embodiments of the present invention are described below with reference to the accompanying drawings.

<System Configuration>

Figure 1:
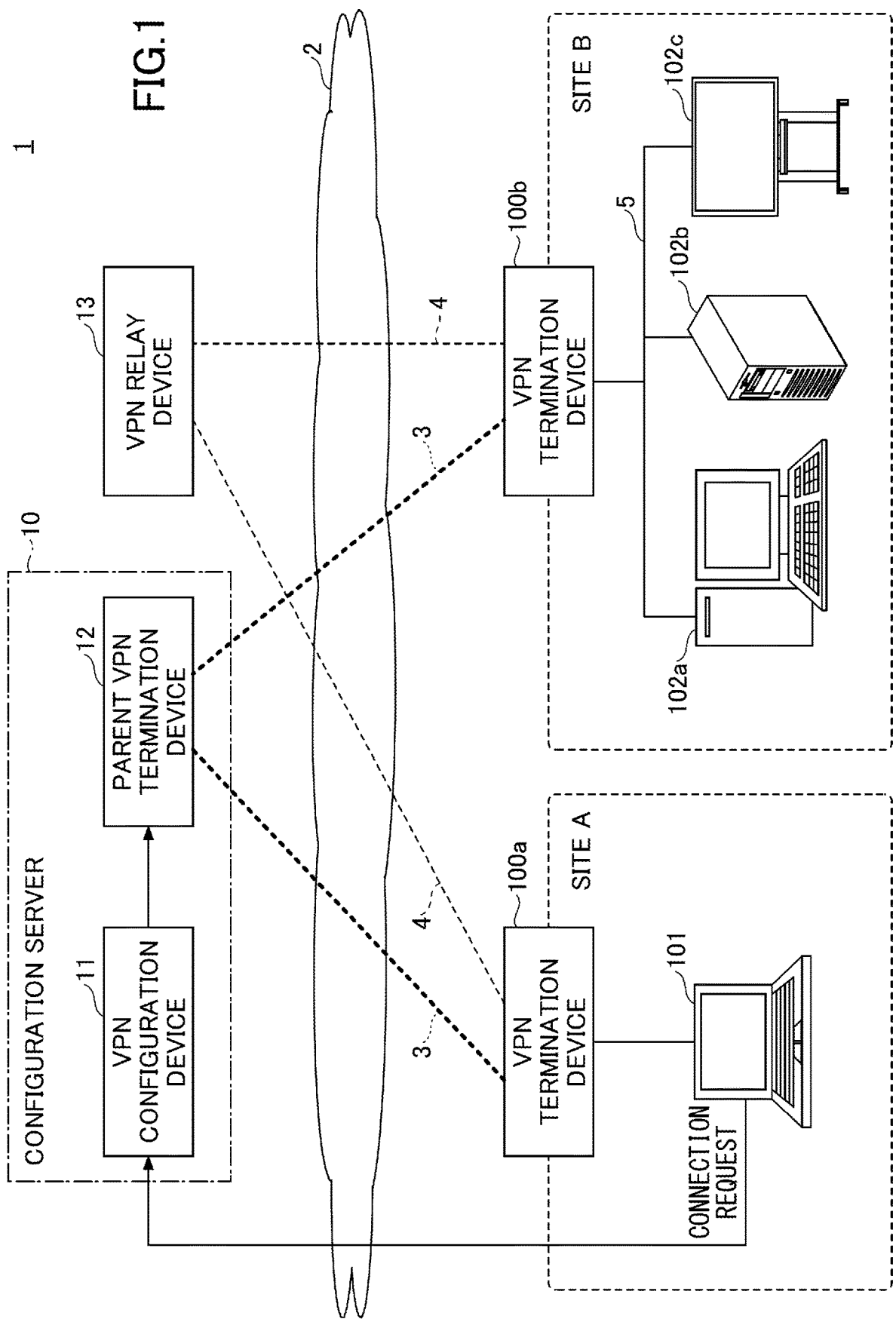
FIG. 1 is a drawing illustrating an example of a system configuration of a communication system according to an embodiment.

FIG. 1 is a drawing illustrating an example of a system configuration of a communication system 1 according to an embodiment. The communication system 1 includes VPN termination devices 100*a* and 100*b* that perform a first virtual private network (VPN) communication 4 between sites A and B on a communication network 2 and a configuration server 10 that configures the first VPN communication 4. In the descriptions below, when it is not necessary to distinguish between them, each of the VPN termination devices 100*a* and 100*b* is referred to as a "VPN termination device 100". The number of the VPN termination devices 100 illustrated in FIG. 1 is an example, and may be three or more.

Preferably, the communication system 1 includes a VPN relay device 13 that relays the first VPN communication 4 between the VPN termination devices 100a and 100b. However, the present invention is not limited to this example, and the VPN termination devices 100a and 100b may be configured to perform the first VPN communication 4 without using the VPN relay device 13.

Preferably, the configuration server 10 includes a parent VPN termination device 12 that performs a second VPN communication 3 different from the first VPN communication 4 on the communication network 2, and performs the second VPN communication 3 with the VPN termination devices 100a and 100b.

VPN is a technology that realizes a virtual private network via the communication network 2 such as the Internet and/or a local area network (LAN) by, for example, encrypting communications. In the present embodiment, a communication using VPN is referred to as a "VPN communication".

The VPN termination device 100 is a termination device for the first VPN communication 4 and the second VPN communication 3, and performs encryption and decryption of the first VPN communication 4 and the second VPN communication 3. In the example of FIG. 1, the VPN termination device 100a is installed in a site A such as a remote office and is connected to an information terminal 101 such as a personal computer (PC) or a tablet terminal used by a user.

The VPN termination device 100b is installed in a site B of, for example, a company to which a user belongs, and is connected to a local network 5 in the company to which multiple network devices 102a through 102c are connected. In the descriptions below, when it is not necessary to distinguish them, each one of the network devices 102a through 102c is referred to as a "network device 102". Examples of the network devices 102 may include an information terminal, a server device, and various electronic devices (e.g., an electronic blackboard, an image forming apparatus, and a projector) installed in a company.

As illustrated in FIG. 1, the configuration server 10 includes, for example, a VPN configuration device 11 for configuring the first VPN communication 4, and a parent VPN termination device 12 for performing the second VPN communication 3 with the VPN termination devices 100. However, the configuration of the configuration server 10 illustrated in FIG. 1 is an example, and the configuration server 10 may be implemented by one server device.

The VPN configuration device 11 is, for example, an information processing apparatus having a configuration of a computer or a system including multiple information processing apparatuses. For example, the VPN configuration device 11 provides a web page (which is hereafter referred to as a "VPN usage page") for using the first VPN communication 4 to the information terminal 101 used by the user. Also, in response to, for example, a connection request received on the VPN usage page, the VPN configuration device 11 sends configuration information for performing the first VPN communication 4 to the VPN termination device 100a in the site A and the VPN termination device 100b in the site B. Upon receiving the configuration information, the VPN termination device 100a and the VPN termination device 100b connect to the VPN relay device 13 via, for example, the first VPN communication 4. As a result, the user can, for example, remotely access the local network 5 in the site B of the company from the site A such as a remote office.

The parent VPN termination device 120 is a VPN termination device that performs the second VPN communication 3 with the VPN termination devices 100 included in the communication system 1. Preferably, the VPN configuration device 11 sends, via the parent VPN termination device 120, the configuration information described above to the VPN termination devices 100 using the second VPN communication 3. This enables the configuration server 10 to securely configure the first VPN communication 4.

With the related-art technologies, a loop may occur in the network in the communication system 1 where the configuration information is set in the VPN termination devices 100 via the communication network 2 by the configuration server 10 for configuring VPN communications. For example, in FIG. 1, if a packet sent from the VPN termination device 100a via the VPN relay device 13 to the VPN termination device 100b is sent to the parent VPN termination device 12, a loop where the packet returns to the VPN termination device 100a occurs. For this reason, in the related-art technologies, for example, packet control rules for selecting and discarding packets are set in the VPN termination devices 100 so that a loop does not occur in the network.

However, the setting of the packet control rules requires a high level of expertise and a large amount of time. Therefore, with the related-art communication systems, it is troublesome to control the network to prevent the occurrence of a loop. In the present embodiment, for example, the VPN termination device 100 has a configuration as illustrated in FIG. 2A to prevent the occurrence of a loop in the network without using packet control rules.

Figure 2B:
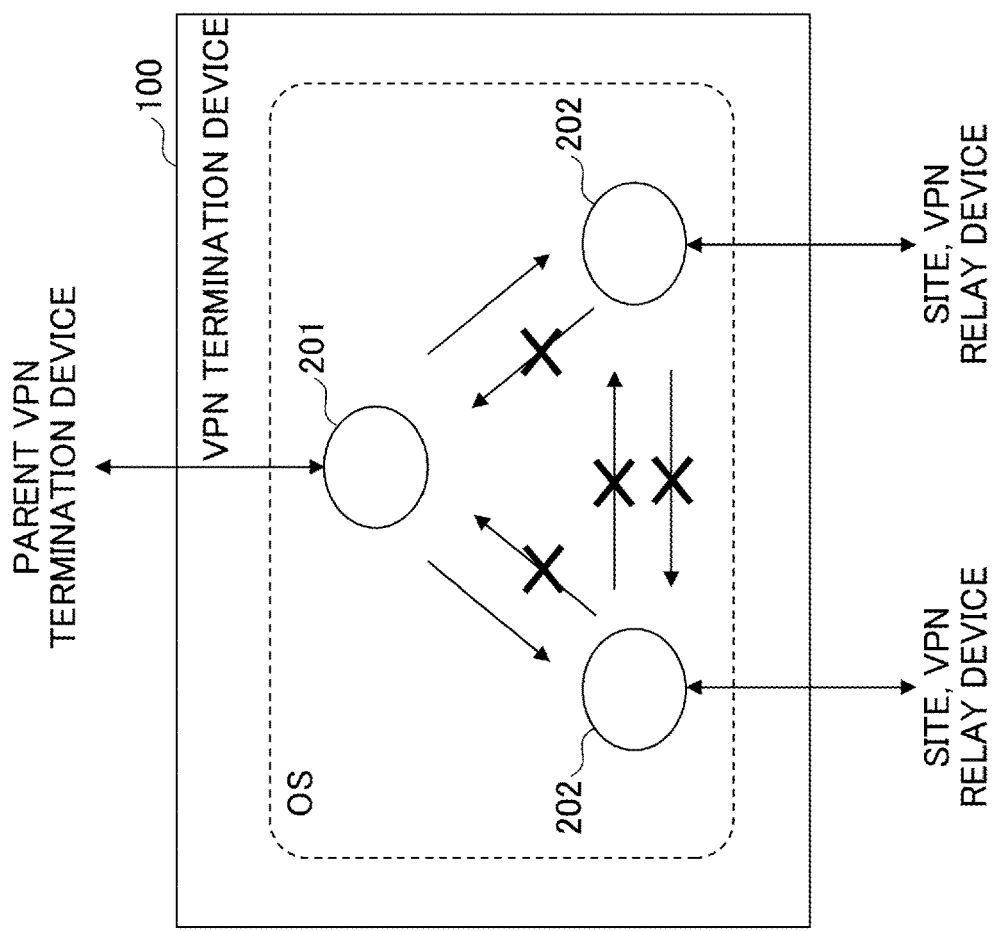
FIGS. 2A and 2B are drawings for explaining an outline of a VPN termination device according to an embodiment.
Figure 2A:
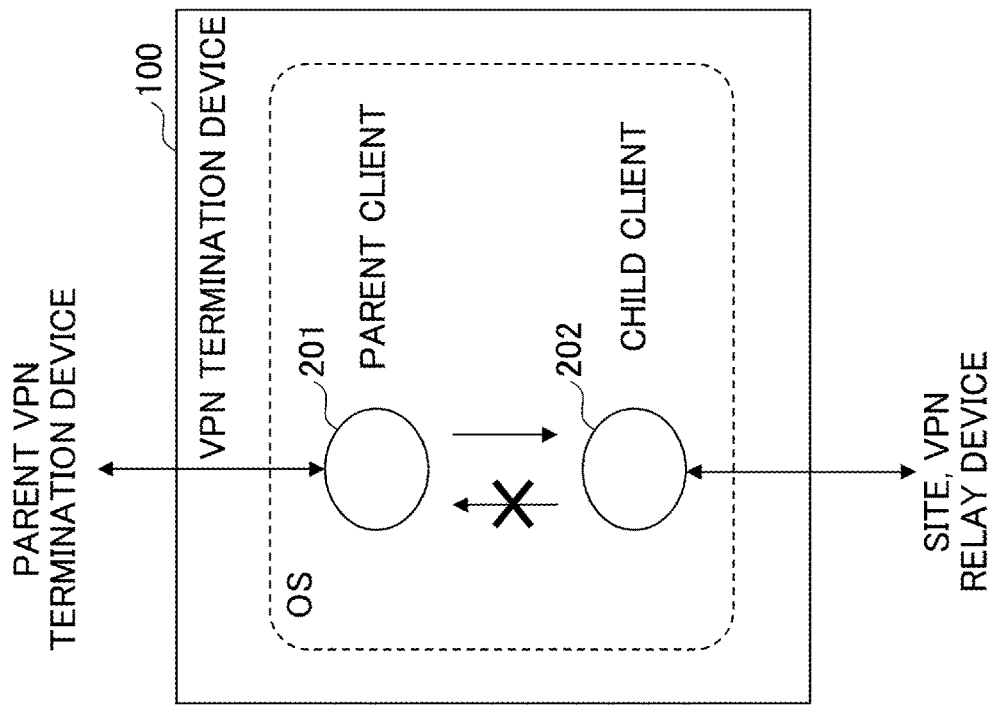

FIG. 2A is a drawing for explaining the outline of the VPN termination device 100 according to an embodiment. As illustrated in FIG. 2A, the VPN termination device 100 of the present embodiment deploys (places) two virtual clients, a parent client 201 and a child client 202, using, for example, functions of an operating system (OS).

The parent client 201 is a virtual client with root authority, and the child client 202 is a virtual client without root authority. The virtual client is a virtual application execution environment, which is implemented by, for example, a Docker container.

As illustrated in FIG. 2A, the parent client 201 can pass data or information to the child client 202, but the child client 202 cannot pass data or information to the parent client 201. Accordingly, by using the parent client 201 to communicate with the parent VPN termination device 12 and using the child client 202 to communicate with a site and the VPN relay device 13, the flow of packets from the VPN termination device 100 to the parent VPN termination device 12 can be blocked. With this configuration, the VPN termination device 100 of the present embodiment can prevent the occurrence of a loop in the network without using packet control rules.

The configuration of the VPN termination device 100 illustrated in FIG. 2A is just an example. For example, the VPN termination device 100 may include multiple child clients 202 as illustrated in FIG. 2B. Even in this case, because each child client 202 cannot send data or information to other virtual clients (the parent client 201 and the other child client 202), the occurrence of a loop in the network can be prevented without using packet control rules.

The above configuration of the present embodiment makes it easier to prevent the occurrence a loop in the network in the communication system 1 where configuration information of multiple VPN termination devices 100 is set via the network by the configuration server 10.

<Hardware Configuration>
(Hardware Configuration of VPN Configuration Device, VPN Relay Device, and Information Terminal)

Figure 3:
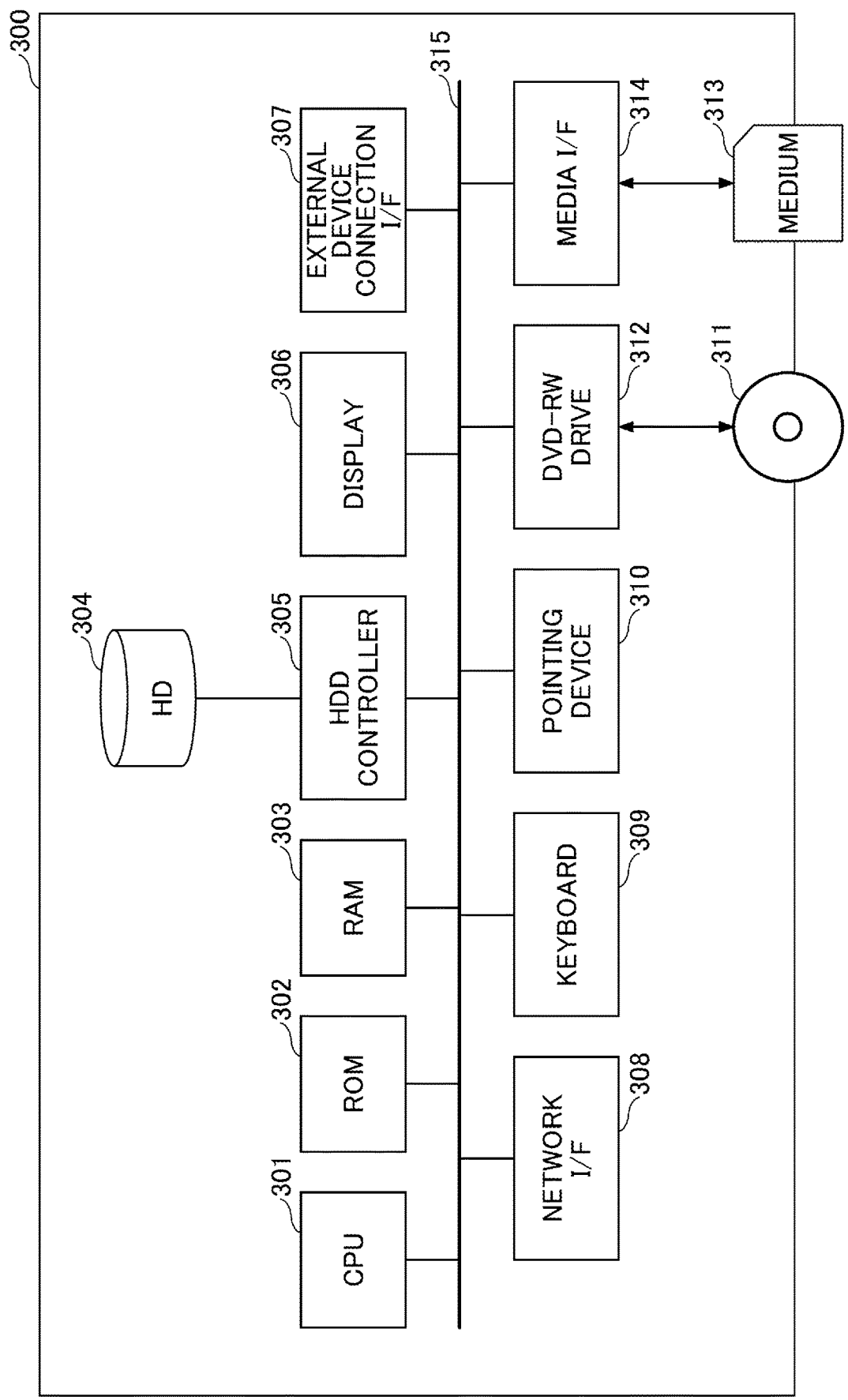
FIG. 3 is a drawing illustrating an example of a hardware configuration of a computer according to an embodiment.

Each of the VPN configuration device 11, the VPN relay device 13, and the information terminal 101 has, for example, a hardware configuration of a computer 300 illustrated in FIG. 3. Alternatively, each of the VPN configuration device 11 and the VPN relay device 13 may be implemented by multiple computers 300.

FIG. 3 is a drawing illustrating an example of a hardware configuration of a computer according to an embodiment. As illustrated in FIG. 3, for example, the computer 300 includes a central processing unit (CPU) 301, a read-only memory (ROM) 302, a random access memory (RAM) 303, a hard disk (HD) 304, a hard disk drive (HDD) controller 305, a display 306, an external device connection interface (I/F) 307, a network I/F 308, a keyboard 309, a pointing device 310, a digital versatile disk rewritable (DVD-RW) drive 312, a media I/F 314, and a bus line 315.

The CPU 301 controls the operations of the entire computer 300. The ROM 302 stores, for example, a program such as an initial program loader (IPL) that is used to start the computer 300. The RAM 303 is used, for example, as a work area of the CPU 301. The HD304 stores, for example, programs such as an operating system (OS), applications, and device drivers, and various types of data. The HDD controller 305 controls, for example, reading and writing of various types of data from and to the HD 304 according to the control of the CPU 301.

The display 306 displays various types of information such as a cursor, menus, windows, characters, and images. The display 306 may be provided outside of the computer 300. The external device connection I/F 307 is, for example, an interface such as a USB for connecting an external device such as a local device. The network I/F 308 is an interface for data communications via the communication network 2.

The keyboard 309 is a type of an input unit including multiple keys for inputting information such as characters, numerical values, and instructions. The pointing device 310 is a type of an input unit for selecting and executing various instructions, selecting a process target, moving a cursor, and so on. The keyboard 309 and the pointing device 310 may instead be provided outside of the computer 300.

The DVD-RW drive 312 controls reading and writing of various types of data from and to the DVD-RW 311, which is an example of a removable recording medium. The DVD-RW 311 may instead be a different type of recording medium such as a DVD-R. The media I/F 314 controls reading and writing (or storing) of data from and to the medium 313 such as a flash memory. The bus line 315 is, for example, an address bus, a data bus, and various control signals for electrically connecting the components of the computer 300.

Figure 4:
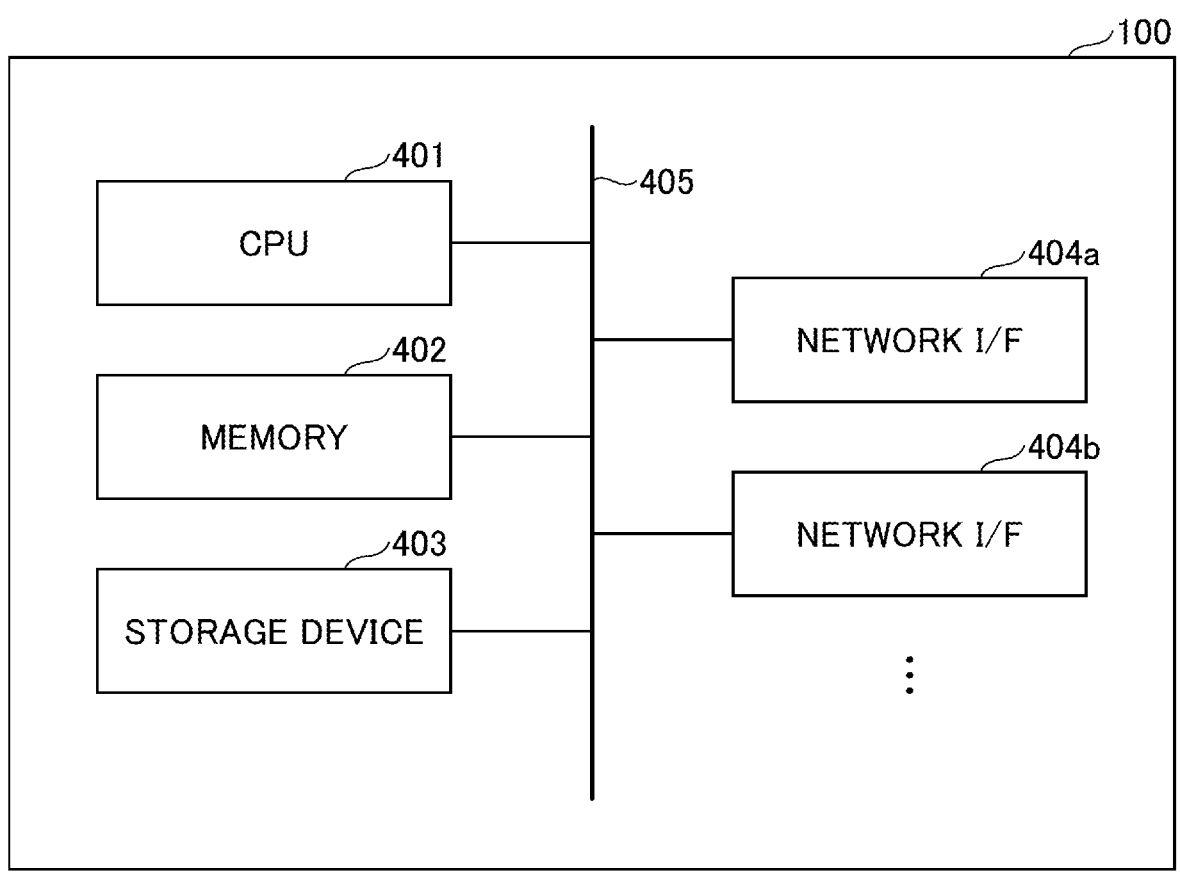
FIG. 4 is a drawing illustrating an example of a hardware configuration of a VPN termination device according to an embodiment.

(Hardware Configuration of VPN Termination Device)
FIG. 4 is a drawing illustrating an example of a hardware configuration of the VPN termination device 100 according to an embodiment. The VPN termination device 100 includes, for example, a CPU 401, a memory 402, a storage device 403, multiple network I/Fs 401a, 404b..., and a bus 405.

The CPU 401 is a processor that implements various functions of the VPN termination device 100 by executing programs. The memory 402 is, for example, a random access memory (RAM) that is a volatile memory used as a work area of the CPU 401 and/or a read-only memory (ROM) where, for example, a program for starting the CPU 401 is stored in advance. The storage device 403 is a large-capacity storage device for storing programs executed by the CPU 401 and various types data, and is implemented by, for example, a solid state drive (SSD).

The network I/Fs 404a, 404b, are communication interfaces for connecting the VPN termination device 100 to, for example, the communication network 2, the information terminal 101, and/or the local network 5 in FIG. 1. The bus 405 is commonly connected to the above-described components of the VPN termination device 100 and transmits, for example, address signals, data signals, and various control signals.

The hardware configuration of the VPN termination device 100 illustrated in FIG. 4 is just an example. The VPN termination device 100 may have any hardware configuration as long as the hardware configuration includes components of a computer and multiple network I/Fs.

(Hardware Configuration of Parent VPN Termination Device)

The parent VPN termination device 12 may have a hardware configuration similar to the hardware configuration of the VPN termination device 100 illustrated in FIG. 4, or may have a hardware configuration obtained by adding multiple network I/Fs to the hardware configuration of the computer 300 illustrated in FIG. 3.

First Embodiment

<Functional Configuration>
FIG. 5 is a drawing illustrating an example of a functional configuration of the communication system 1 according to a first embodiment.

(Functional Configuration of VPN Termination Device)
First, a functional configuration of the VPN termination devices 100a and 100b is described with reference to FIG. 5. Here, a functional configuration of the VPN termination device 100 is described because the VPN termination devices 100a and 100b have substantially the same functional configuration.

For example, the VPN termination device 100 implements a virtual client controller 501, a configuration information receiver 502, a communication controller 503, a first VPN communication unit 504, and a storage 505 by executing predetermined programs with the CPU 401 illustrated in FIG. 4. At least a part of the functional components described above may be implemented by hardware.

The virtual client controller 501 controls, for example, the parent client 201 and the child client 202 described with reference to FIG. 2A. For example, at start-up, the virtual client controller 501 starts the configuration information receiver 502 with the parent client 201 having root authority and starts the communication controller 503 and the first VPN communication unit 504 with the child client 202 that does not have root authority.

The configuration information receiver 502 performs a configuration information reception process for receiving configuration information for the first VPN communication 4 transmitted from the configuration server 10. For example, the configuration information receiver 502 performs the second VPN communication 3 with the configuration server 10, decrypts encrypted configuration information received from the configuration server 10, and sends the decrypted configuration information to the communication controller 503.

The communication controller 503 executes a communication control process for controlling the first VPN communication 4 based on the configuration information received from the configuration information receiver 502. The first VPN communication unit 504 performs a first VPN communication process for performing the first VPN communication 4 with another VPN termination device 100 according to the control of the communication controller 503.

For example, when the VPN termination device 100a and the VPN termination device 100b perform the first VPN communication 4 via the VPN relay device 13 as illustrated in FIG. 5, the configuration information sent from the configuration server 10 includes connection information for connection with the VPN relay device 13. In this case, the communication controller 503 sends connection information such as a uniform resource locator (URL) of the VPN relay device 13 to the first VPN communication unit 504 to request the first VPN communication unit 504 to connect to the VPN relay device 13 for the first VPN communication 4.

The storage 505 is implemented by, for example, a program executed by the CPU 401 and the storage device 403 in FIG. 4, and stores various types of information (or data) such as termination device information 506 illustrated in FIG. 6D.

FIG. 6D illustrates an example of the termination device information 506. In the example of FIG. 6D, the termination device information 506 includes items such as "termination device ID (own device)", "termination device (parent) URL", "IP address of parent client", and "IP address of child client". The "termination device ID (own device)" is identification information for identifying the VPN termination device 100 (own device). The "termination device (parent) URL" is connection information such as a URL of the parent VPN termination device 12 to which the VPN termination device 100 connects via the second VPN communication 3 at, for example, start-up. The "termination device (parent) URL" may instead be connection information (for example, an IP address) other than a URL.

The "IP address of the parent client" is the IP address of the parent client 201 of the VPN termination device 100 and is used, for example, when the virtual client controller 501 starts the configuration information receiver 502 with the parent client 201. The "IP address of the child client" is the IP address of the child client 202 of the VPN termination device 100 and is used, for example, when the virtual client controller 501 starts the first VPN communication unit 504 with the child client 202.

(Functional Configuration of Configuration Server)

The configuration server 10 implements a receiver 511, an information manager 512, a configuration information transmitter 514, and a storage 515 by, for example, executing predetermined programs with the CPU 301 in FIG. 3. At least a part of the functional components described above may be implemented by hardware. Also, the configuration server 10 includes a second VPN communication unit 513 implemented by, for example, the parent VPN termination device 12. The second VPN communication unit 513 may be implemented by a program executed by a CPU included in the VPN configuration device 11 or the parent VPN termination device 12.

The receiver 511 performs a reception process for receiving a connection request requesting a connection for the first VPN communication 4 from, for example, the information terminal 101 used by the user. For example, the receiver 511 functions as a web server for providing a VPN usage page that is a web page for using the first VPN communication 4, and receives connection requests and disconnection requests for the first VPN communication 4 on the VPN usage page.

For example, the information manager 512 stores and manages user information 516a, tenant information 516b, and device information 516c as illustrated in FIGS. 6A through 6C in the storage 515.

FIG. 6A illustrates an example of the user information 516a managed by the information manager 512. In the example of FIG. 6A, the user information 516a includes items such as "user ID", "authentication information", and "tenant ID".

The "user ID" is identification information that identifies a user registered in the communication system 1. The "authentication information" is, for example, a password for authenticating the user. The authentication information may also be information such as a digital certificate or biometric information other than a password. The "tenant ID" is identification information that identifies a tenant (or a group) to which the user belongs. Examples of tenants include various groups such as a company, a community, an organization, a medical institution, and an educational institution that have contracts with the communication system 1.

FIG. 6B illustrates an example of the tenant information 516b managed by the information manager 512. In the example of FIG. 6B, the tenant information 516b includes items such as "tenant ID", "termination device ID (dedicated)", "relay device URL", and "termination device ID (shared)".

The "tenant ID" is identification information that identifies a tenant and corresponds to the "tenant ID" included in the user information 516a. The "termination device ID (dedicated)" is identification information that identifies a dedicated VPN termination device 100 (for example, the VPN termination device 100b in FIG. 1) used exclusively by a tenant. The "relay device URL" is a URL for connecting to the VPN relay device 13 used by the tenant. The "relay device URL" may also be connection information such as an IP address other than a URL. The "termination device ID (shared)" is identification information for identifying a shared VPN termination device (e.g., the VPN termination device 100a in FIG. 1) that performs the first VPN communication with the dedicated VPN termination device 100 exclusively used by each tenant.

FIG. 6C illustrates an example of the device information 516c managed by the information manager 512. In the example of FIG. 6C, the device information 516c includes items such as "termination device ID", "interface", "attribute", and "IP address". The "termination device ID" is identification information that identifies the VPN termination device 100 such as the VPN termination device 100a or the VPN termination device 100b included in the communication system 1. The "interface" is information that indicates an interface (for example, a port of the configuration server 10 or the parent VPN termination device 12) to which the VPN termination device 100 corresponding to the "termination device ID" is connected. The "attribute" is information that indicates whether the VPN termination device 100 corresponding to the "termination device ID" is a shared VPN termination device 100 or a dedicated VPN termination device 100 dedicated to each tenant. The "IP address" is information that indicates an IP address of the VPN termination device 100 corresponding to the "termination device ID".

With the user information 516a, the tenant information 516b, and the device information 516c, the configuration server 10 can obtain information on the VPN termination devices 100a and 100b and the VPN relay device 13 used for the first VPN communication 4 based on the user ID of the user.

Referring back to FIG. 5, the functional configuration of the configuration server 10 is further described.

The second VPN communication unit 513 performs the second VPN communication 3 with the VPN termination devices 100a and 100b included in the communication system 1. For example, at start-up, each of the VPN termination devices 100a and 100b included in the communication system 1 refers to the termination device information 506 and sends request information requesting the establishment of the second VPN communication 3 to the configuration server 10. The second VPN communication unit 513 establishes the second VPN communication 3 with each of the VPN termination devices 100a and 100b in response to the request information from the VPN termination devices 100a and 100b. As a result, the configuration information transmitter 514 of the configuration server 10 is enabled to transmit configuration information to the VPN termination devices 100a and 100b via the second VPN communication 3.

The configuration information transmitter 514 sends the configuration information for the first VPN communication 4 to the VPN termination devices 100a and 100b based on the connection request sent from the information terminal 101 of the user and information being managed by the information manager 512. Preferably, the configuration information transmitter 514 sends the configuration information to the VPN termination devices 100a and 100b via the second VPN communication 3.

The storage 515 is implemented by, for example, a program executed by the CPU 301, the HD 304, and the HDD controller 305 in FIG. 3, and stores various types of information or data including the user information 516a, the tenant information 516b, and the device information 516c described above.

The functional configuration of the configuration server 10 illustrated in FIG. 5 is just an example. For example, the information manager 512 may store and manage the user information 516a, the tenant information 516b, and the device information 516c in a server device outside of the configuration server 10. Also, the second VPN communication unit 513 may be implemented by, for example, a parent VPN termination device 12 outside of the configuration server 10.

(Functional Configuration of VPN Relay Device)

The VPN relay device 13 implements the relay controller 521, the VPN relay 522, and the storage 523 by, for example, executing predetermined programs with the CPU 301 in FIG. 3. At least a part of the functional components described above may be implemented by hardware.

The relay controller 521 establishes the first VPN communication 4 with the VPN termination devices 100 that perform the first VPN communication 44 based on requests from the VPN termination devices 100.

The VPN relay 522 performs a relay process of forwarding data (packet) received from one of the VPN termination devices 100 performing the first VPN communication 4 to another one of the VPN termination devices 100.

The storage 523 is implemented by, for example, a program executed by CPU 301, the HD 304, and the HDD controller 305 in FIG. 3 and stores various types of information or data.

<Processes>

Processes according to the communication control method of the first embodiment are described below.

(Process at Start-Up of VPN Termination Device)

FIG. 7 is a sequence chart illustrating an example of a process performed when a VPN termination device is started according to the first embodiment. Steps S701 through S704 in FIG. 7 represent an example of a process performed by the VPN termination device 100 at start-up.

At step S701, when the VPN termination device 100 starts, the virtual client controller 501 is first started, and the virtual client controller 501 starts the configuration information receiver 502 with the parent client 201 that is a virtual client having root authority. For example, the virtual client controller 501 starts a program for implementing the configuration information receiver 502 with the parent client 201.

At step S702, the virtual client controller 501 starts the communication controller 503 and the first VPN communication unit 504 with the child client 202, which is a virtual client without root authority. For example, the virtual client controller 501 starts programs that implement the communication controller 503 and the first VPN communication unit 504 with the child client 202.

At step S703, the configuration information receiver 502 requests the configuration server 10 to establish a connection for the second VPN communication 3 by using, for example, the network I/F 404a in FIG. 4.

At step S704, the second VPN communication 3 is established according to a predetermined protocol between the second VPN communication unit 513 of the configuration server 10 and the configuration information receiver 502.

As a result, the configuration server 10 is enabled to send the configuration information for the first VPN communication to the VPN termination device 100 via the second VPN communication 3.

In this state, for example, when the configuration information transmitter 514 of the configuration server 10 sends the configuration information for the first VPN communication via the second VPN communication 3 at step S711, step S712 and subsequent steps are performed.

At steps S712 and S713, the configuration information receiver 502 decrypts the encrypted configuration information for the first VPN communication received via the second VPN communication 3, and sends the decrypted configuration information for the first VPN communication to the communication controller 503 via the virtual client controller 501.

At step S714, the communication controller 503 performs a control related to the first VPN communication 4 on the first VPN communication unit 504 based on the sent configuration information. For example, the communication controller 503 requests the first VPN communication unit 504 to establish or terminate a connection for the first VPN communication with the URL of the VPN relay device 13 included in the configuration information.

(Process of Starting First VPN Communication)

Figure 9:
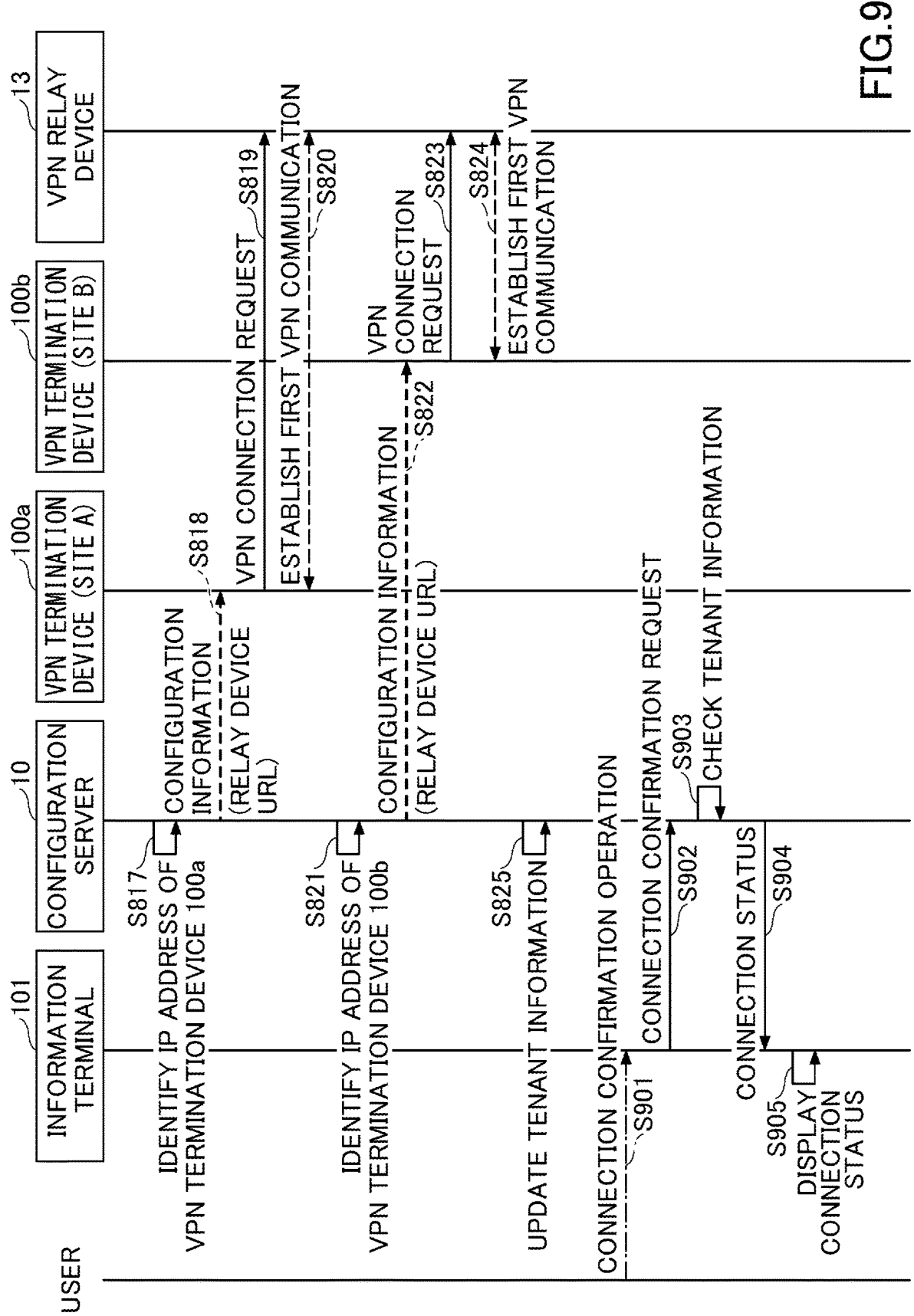
FIG. 9 is a sequence chart illustrating an example of a process of starting the first VPN communication according to the first embodiment.

FIGS. 8 and 9 are sequence charts illustrating an example of a process of starting a first VPN communication. Here, it is assumed that at the start of the process illustrated in FIG. 8, the VPN termination device 100a and the VPN termination device 100b have already performed steps S701 through S704 in FIG. 7 and are connected to the configuration server 10 via the second VPN communication 3. It is also assumed that the information terminal 101 of the user is connected to the VPN termination device 100a at the site A as illustrated in FIG. 1. Further, it is assumed that the VPN termination device 100b is located in the site B of, for example, a company to which the user belongs, and is connected to the local network 5 in the site B.

At step S801, the user performs an operation on the information terminal 101 to start the first VPN communication 4. For example, the user enters the URL of the configuration server 10 on a web browser of the information terminal 101. In response, at step S802, the web browser of the information terminal 101 sends an access request to the configuration server 10 based on the entered URL.

At step S803, the receiver 511 of the configuration server 10 sends, for example, a login page to the information terminal 101 in response to the access request received from the information terminal 101. At step S804, the web browser of the information terminal 101 displays the login page received from the configuration server 10.

At step S805, the user performs a login operation on the displayed login page. For example, the user enters login information such as a user ID and authentication information (e.g., a password) on the login page. In response, at step S806, the web browser of the information terminal 101 sends the entered login information to the configuration server 10.

At step S807, the receiver 511 of the configuration server 10 authenticates the login information received from the information terminal 101. For example, the receiver 511 permits the user to log in when the combination of the user ID and the authentication information (e.g., a password) included in the login information is stored in the user information 516a as illustrated in FIG. 6A. On the other hand, the receiver 511 rejects the login of the user when the combination of the user ID and the authentication information included in the login information is not stored in the user information 516a.

Steps S803 through S807 are just examples. For example, when the user or the information terminal 101 has already logged into the configuration server 10, the receiver 511 of the configuration server 10 may omit steps S803 through S807. Also, the receiver 511 of the configuration server 10 may use an external authentication server to perform the authentication process at step S807. Further, the receiver 511 of the configuration server 10 may perform the authentication process by, for example, OpenID authentication. The descriptions below are based on an assumption that the login of the user is allowed.

At step S808, the receiver 511 of the configuration server 10 sends a VPN usage page for using the first VPN communication 4 to the information terminal 101. At step S809, the web browser of the information terminal 101 displays the VPN usage page received from the configuration server 10.

Figure 10:
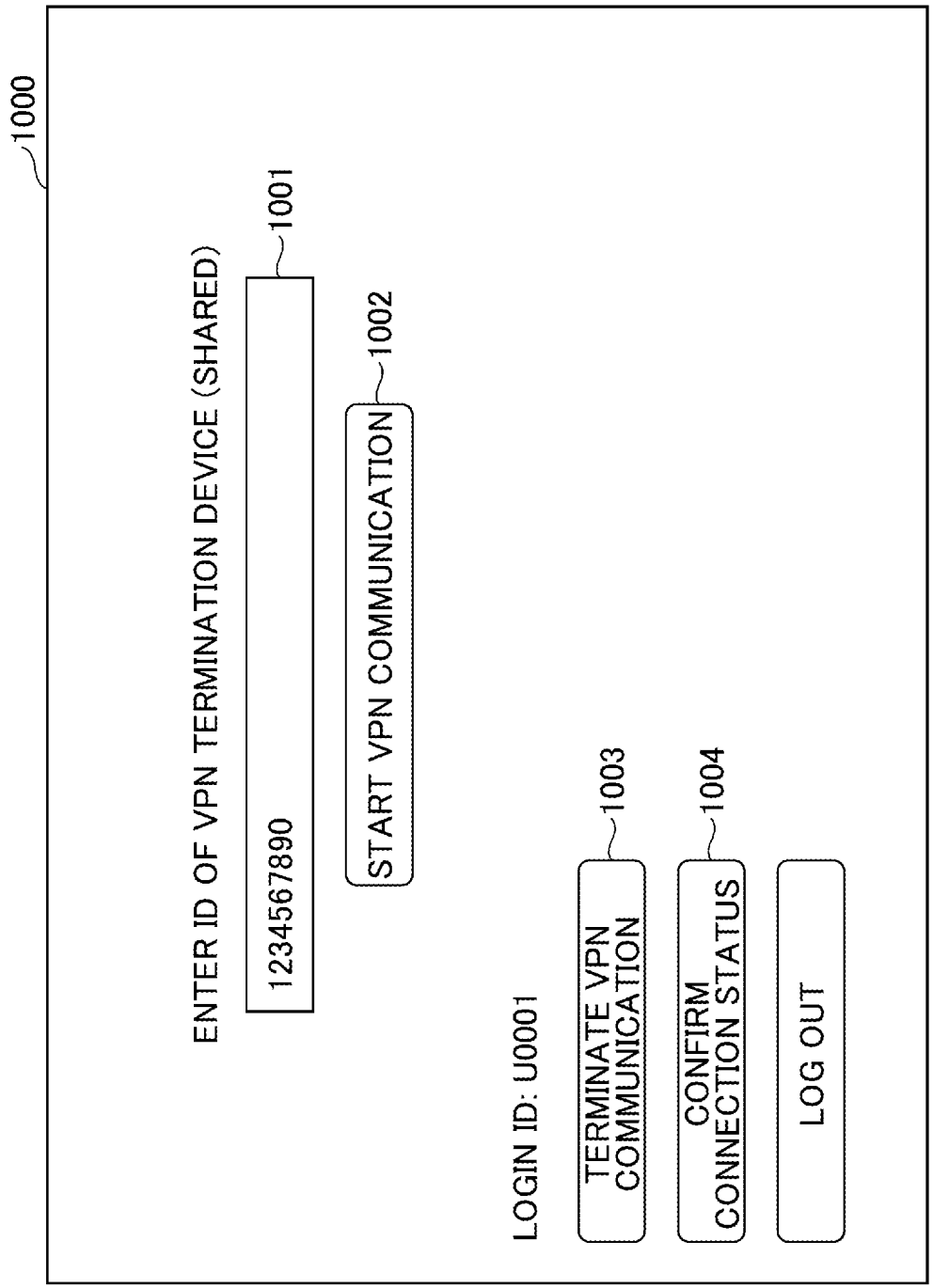
FIG. 10 is a drawing illustrating an example of a display screen of a VPN usage page according to the first embodiment.

FIG. 10 illustrates an example of a display screen of the VPN usage page according to the first embodiment. FIG. 10 is an example of a display screen 1000 of the VPN usage page displayed by the web browser the information terminal 101 at step S809 of FIG. 8. In the example of FIG. 10, the display screen 1000 includes an input field 1001 for entering an ID (termination device ID) of the VPN termination device 100a connected to the information terminal 101 and a button 1002 for starting the VPN communication (the first VPN communication 4). The display screen 1000 also includes a button 1003 for terminating the VPN communication (the first VPN communication 4) and a button 1004 to confirm the connection status.

At step S810, the user performs a connection operation on the display screen 1000 of the VPN usage page as illustrated in FIG. 10. For example, the user enters the termination device ID of the VPN termination device 100a in the input field 1001 of the display screen 1000 illustrated in FIG. 10 and selects the button 1002 for starting the VPN communication (the first VPN communication 4). In response, at step S811, the web browser of the information terminal 101 sends a connection request including the entered termination device ID of the VPN termination device 100a to the configuration server 10.

At step S812, the configuration information transmitter 514 of the configuration server 10 obtains, for example, the user information 516a, the tenant information 516b, and the device information 516c being managed by the information manager 512.

At step S813, the configuration information transmitter 514 confirms that the VPN termination device 100a is available by referring to, for example, the obtained tenant information 516b as illustrated in FIG. 6B. For example, the configuration information transmitter 514 determines that the VPN termination device 100a is not available when the termination device ID of the VPN termination device 100a is stored in "termination device ID (shared)" in the tenant information 516b. In this case, for example, the configuration information transmitter 514 causes the VPN usage page to display information indicating that the VPN termination device 100a is in use and performs a process illustrated in FIG. 8.

On the other hand, the configuration information transmitter 514 determines that the VPN termination device 100a is available when the termination device ID of the VPN termination device 100a is not stored in "termination device ID (shared)" in the tenant information 516b. In the descriptions below, it is assumed that the VPN termination device 100a is available.

At step S814, the configuration information transmitter 514 of the configuration server 10 obtains a relay device URL for the tenant to which the user belongs by referring to the user information 516a and the tenant information 516b, and sends a start request requesting the VPN relay device 13 to start.

At steps S815 and S816, when receiving the start request from the configuration server 10, the VPN relay device 13 performs a start process to start, for example, the relay controller 521 and the VPN relay 522 and sends a start report to the configuration server 10.

Steps S814 through S816 are just examples. For example, in a system where the VPN relay device 13 is always running, steps S814 through S816 may be omitted. Also, the configuration server 10 may establish the second VPN communication 3 with the VPN relay device 13 and send the start request via the second VPN communication 3.

Next, at step S817 in FIG. 9, the configuration information transmitter 514 of the configuration server 10 identifies an IP address of the VPN termination device 100a by using the termination device ID of the VPN termination device 100a included in the connection request and the device information 516c.

At step S818, the configuration information transmitter 514 of the configuration server 10 sends configuration information for the first VPN communication 4 to the VPN termination device 100a via, for example, the second VPN communication 3. The configuration information includes, for example, a URL (relay device URL) for connecting to the VPN relay device 13.

At step S819, the VPN termination device 100a executes, for example, steps S712 through S714 in FIG. 7. In response, the first VPN communication unit 504 of the VPN termination device 100a sends a VPN connection request for a connection via the first VPN communication 4 to the VPN relay device 13.

At step S820, the first VPN communication 4 is established between the first VPN communication unit 504 of the VPN termination device 100a and the relay controller 521 of the VPN relay device 13 according to a predetermined protocol.

At step S821, the configuration information transmitter 514 of the configuration server 10 identifies an IP address of the dedicated VPN termination device 100b corresponding to a tenant such as a company to which the user belongs by referring to the user information 516a, the tenant information 516b, and the device information 516c.

At step S822, the configuration information transmitter 514 of the configuration server 10 sends configuration information for the first VPN communication 4 to the VPN termination device 100b via, for example, the second VPN communication 3. The configuration information includes, for example, a URL (relay device URL) for connecting to the VPN relay device 13.

At step S823, the VPN termination device 100b performs, for example, steps S712 through S714 in FIG. 7. In response, the first VPN communication unit 504 of the VPN termination device 100b sends a VPN connection request for a connection via the first VPN communication 4 to the VPN relay device 13.

At step S824, the first VPN communication 4 is established between the first VPN communication unit 504 of the VPN termination device 100b and the relay controller 521 of the VPN relay device 13 according to a predetermined protocol.

The above process enables the VPN termination device 100a and the VPN termination device 100b to communicate with each other via the first VPN communication 4 through the VPN relay device 13.

At step S825, the information manager 512 of the configuration server 10 stores the termination device ID of the VPN termination device 100a in "termination device ID (shared)" in the tenant information 516b illustrated in FIG. 6B.

For example, the user can confirm the connection status by selecting the button 1004 on the display screen 1000 of the VPN usage page illustrated in FIG. 10.

For example, when the user selects the button 1004 to confirm the connection status at step S901, the web browser of the information terminal 101 sends a connection confirmation request to the configuration server 10 at step S902.

At step S903, the receiver 511 of the configuration server 10 confirms the connection status of the VPN termination device 100a by referring to "termination device ID (shared)" in the tenant information 516b illustrated in FIG. 6B, which corresponds to the tenant ID of, for example, a company to which the user belongs.

At step S904, the receiver 511 of the configuration server 10 sends the connection status of the VPN termination device 100a to the information terminal 101. In response, at step S905, the web browser of the information terminal 101 displays the connection status of the VPN termination device 100a on, for example, the display screen 1000.

(Process of Terminating First VPN Communication)

Figure 11:
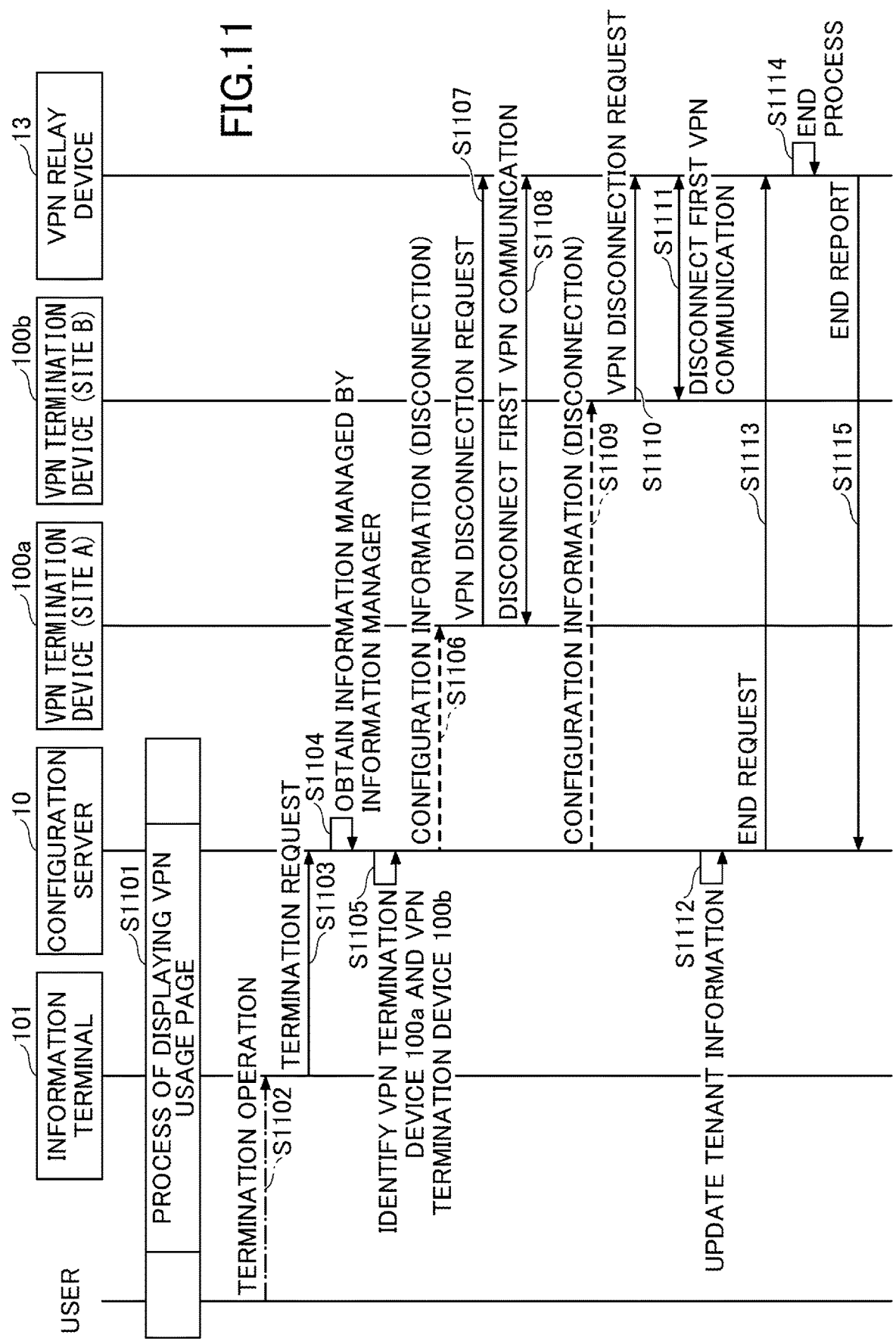
FIG. 11 is a sequence chart illustrating an example of a process of terminating the first VPN communication according to the first embodiment.

FIG. 11 is a sequence chart illustrating an example of a process of terminating a VPN communication according to the first embodiment. In this example, the first VPN communication started by the first VPN communication start process described with reference to FIGS. 8 and 9 is terminated.

At step S1101, the communication system 1 performs, for example, steps S801 through S809 in FIG. 8, and the web browser of the information terminal 101 displays the display screen 1000 of the VPN usage page as illustrated in FIG. 10.

At step S1102, the user performs a termination operation for terminating the first VPN communication 4 by, for example, selecting the button 1003 for terminating the VPN communication on the display screen 1000 illustrated in FIG. 10. In response, at step S1003, the web browser of the information terminal 101 sends a termination request for requesting the termination of the first VPN communication 4 to the configuration server 10.

At step S1104, the configuration information transmitter 514 of the configuration server 10 obtains the user information 516a, the tenant information 516b, and the device information 516c being managed by the information manager 512. Also, at step S1105, the configuration information transmitter 514 identifies the VPN termination device 100a and the VPN termination device 100b corresponding to the tenant ID of the tenant to which the user belongs by referring to the user information 516a, the tenant information 516b, and the device information 516c.

At step S1106, the configuration information transmitter 514 of the configuration server 10 sends configuration information (disconnection) requesting the disconnection of the first VPN communication 4 to the VPN termination device 100a via the second VPN communication 3.

At step S1107, the VPN termination device 100a performs, for example, steps S712 through S714 in FIG. 7. In response, the first VPN communication unit 504 of the VPN termination device 100a sends a VPN disconnection request requesting the disconnection of the first VPN communication 4 to the VPN relay device 13.

At step S1108, the first VPN communication 4 between the first VPN communication unit 504 of the VPN termination device 100a and the relay controller 521 of the VPN relay device 13 is disconnected according to a predetermined protocol.

At step S1109, the configuration information transmitter 514 of the configuration server 10 sends configuration information (disconnection) requesting the disconnection of the first VPN communication 4 to the VPN termination device 100b via the second VPN communication 3.

At step S1110, the VPN termination device 100b performs, for example, steps S712 through S714 in FIG. 7. In response, the first VPN communication unit 504 of the VPN termination device 100b sends a VPN disconnection request requesting the disconnection of the first VPN communication 4 to the VPN relay device 13.

At step S1111, the first VPN communication 4 between the first VPN communication unit 504 of the VPN termination device 100b and the relay controller 521 of the VPN relay device 13 is disconnected according to a predetermined protocol.

At step S1112, the information manager 512 of the configuration server 10 updates the tenant information 516b illustrated in FIG. 6B.

At step S1113, the configuration information transmitter 514 of the configuration server 10 sends an end request for requesting the VPN relay device 13 to terminate operations.

At steps S1114 and S1115, upon receiving the end request from the configuration server 10, the VPN relay device 13 performs an end process to terminate, for example, the relay controller 521 and the VPN relay 522, and sends an end report to the configuration server 10.

The above process makes it easier to prevent the occurrence of a loop in the network in the communication system 1 where the configuration server 10 sets configuration information of multiple VPN termination devices 100 via the network.

Second Embodiment

In the first embodiment, an example of a process is described based on an assumption that the shared VPN termination device 100a performs the first VPN communication 4 with one dedicated VPN termination device 100b. However, the present invention is not limited to this example, and the shared VPN termination device 100a may perform the first VPN communication 4 with multiple dedicated VPN termination devices 100.

In a second embodiment, an example of a process is described based on an assumption that the shared VPN termination device 100a performs the first VPN communication 4 with multiple dedicated VPN termination devices 100b and 100c.

<Functional Configuration>

Figure 12:
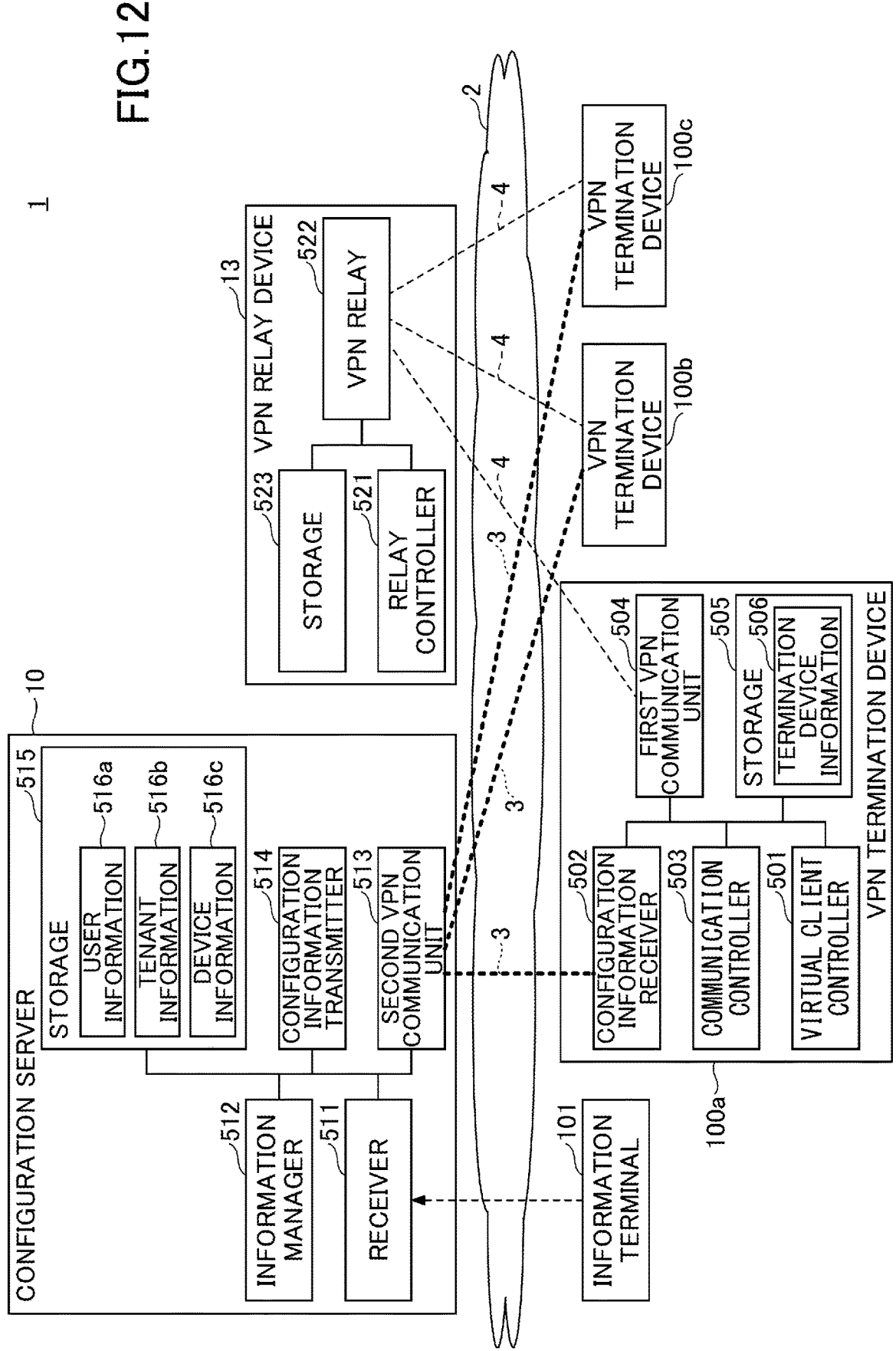
FIG. 12 is a drawing illustrating an example of a functional configuration of a communication system according to a second embodiment.

FIG. 12 is a drawing illustrating an example of a functional configuration of a communication system according to the second embodiment. The communication system 1 of the second embodiment is different from the communication system 1 of the first embodiment illustrated in FIG. 5 in that the VPN termination device 100c is added. Here, it is assumed that the VPN termination device 100c has substantially the same functional configuration as the VPN termination devices 100a and 100b, and is installed in a site C of, for example, a company to which the user belongs.

<Processes>

Figure 13:
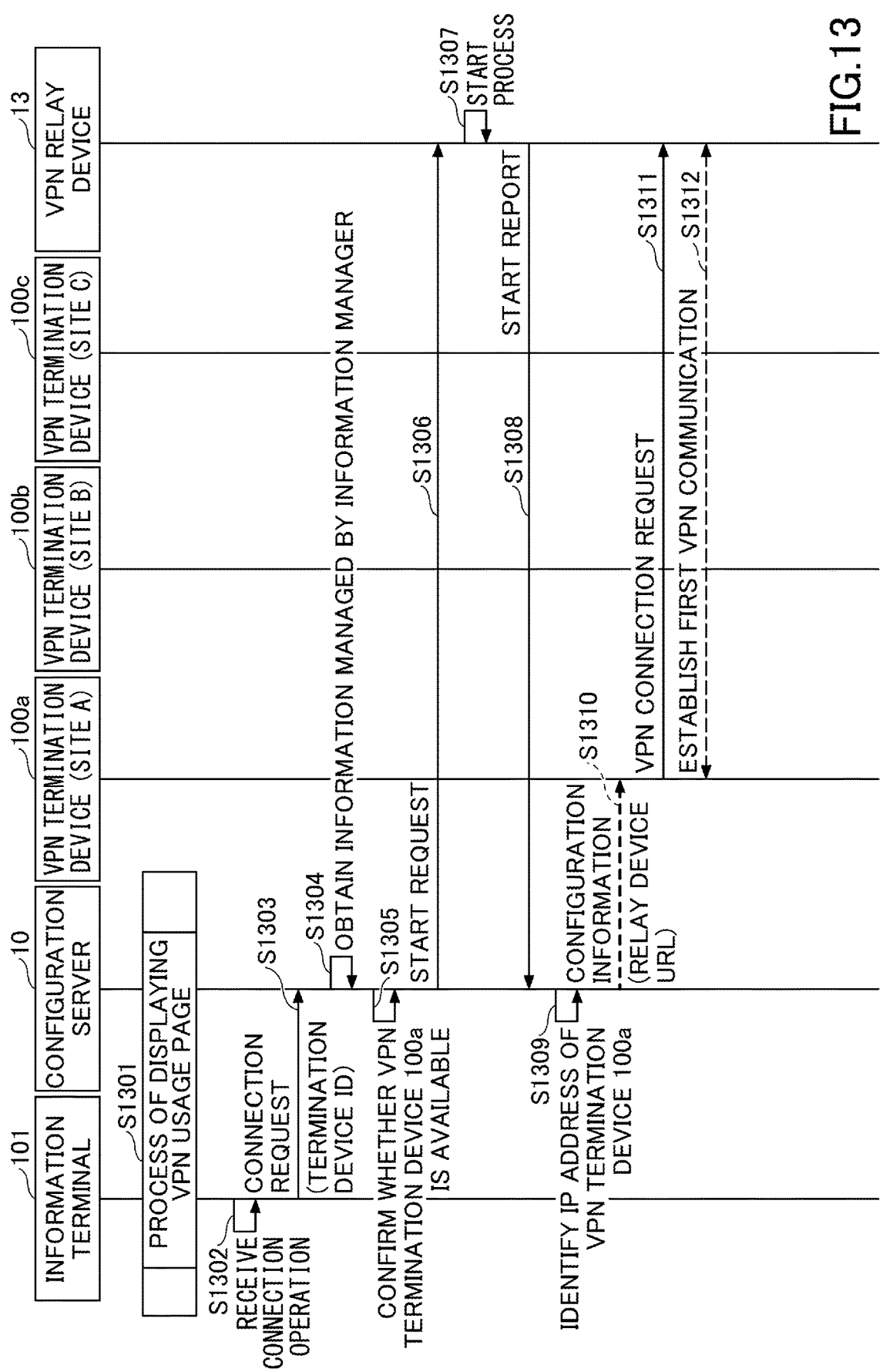
FIG. 13 is a sequence chart illustrating an example of a process of starting a first VPN communication according to the second embodiment.
Figure 14:
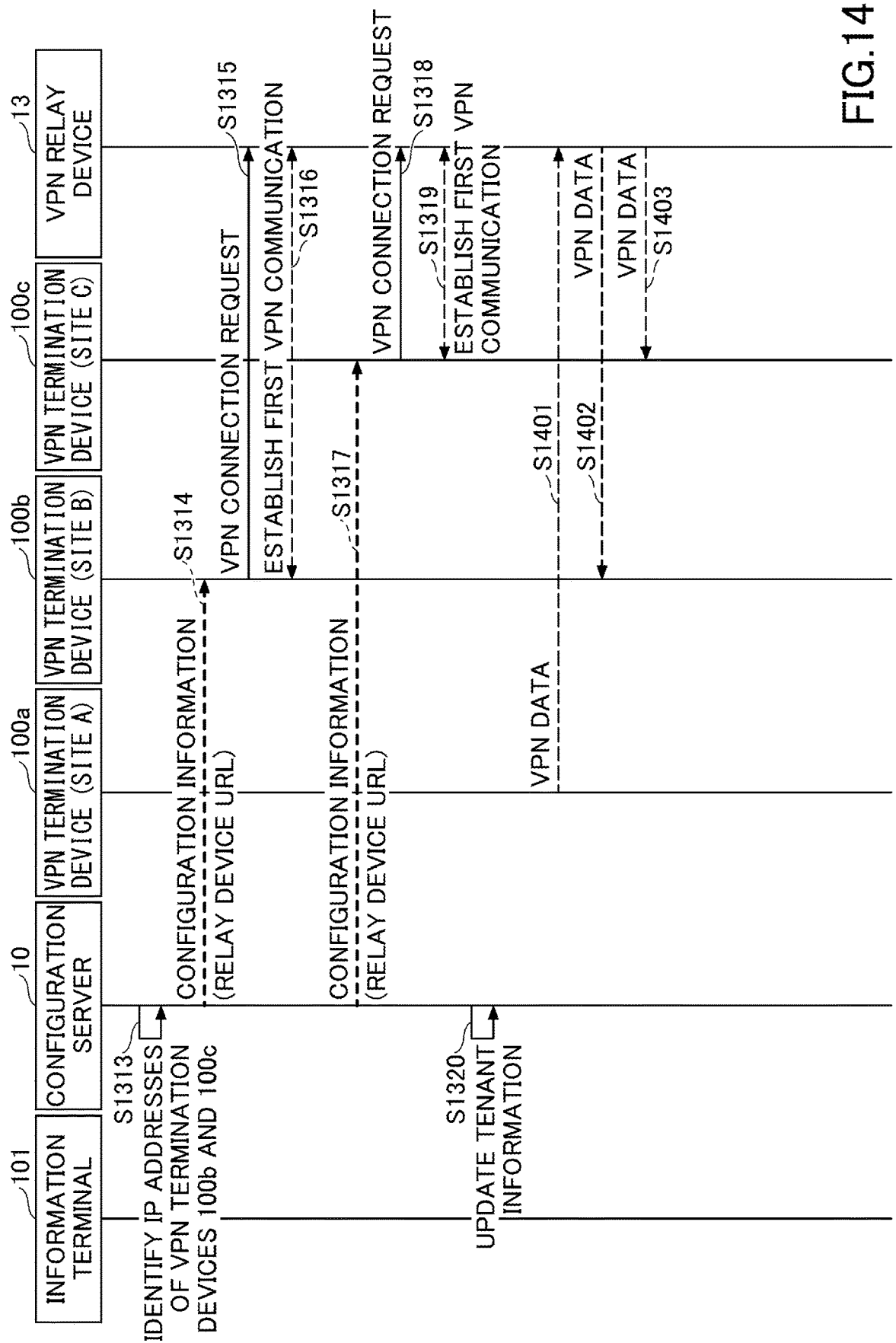
FIG. 14 is a sequence chart illustrating an example of a process of starting the first VPN communication according to the second embodiment.

FIGS. 13 and 14 are sequence charts illustrating an example of a process of starting a first VPN communication according to the second embodiment. Because basic steps in FIGS. 13 and 14 are substantially the same as those of the first VPN communication start process of the first embodiment described with reference to FIGS. 8 and 9, the detailed descriptions of steps that are the same as those of the first embodiment are omitted here.

At step S1301, the communication system 1 performs, for example, steps S801 through S809 in FIG. 8, and the web browser of the information terminal 101 displays the display screen 1000 of the VPN usage page as illustrated in FIG. 10.

At steps S1302 and S1303, when receiving a connection operation on the display screen 1000 of the VPN usage page, the web browser of the information terminal 101 sends a connection request including the entered termination device ID of the VPN termination device 100a to the configuration server 10.

At step S1304, the configuration information transmitter 514 of the configuration server 10 obtains the user information 516a, the tenant information 516b, and the device information 516c being managed by the information manager 512.

At step S1305, the configuration information transmitter 514 confirms that the VPN termination device 100a is available by referring to, for example, the obtained tenant information 516b as illustrated in FIG. 6B. When the VPN termination device 100a is the available, the configuration information transmitter 514 performs step S1306 and subsequent steps.

At step S1306, the configuration information transmitter 514 of the configuration server 10 obtains the relay device URL for the tenant to which the user belongs by referring to the user information 516a and the tenant information 516b, and sends a start request requesting the VPN relay device 13 to start.

At steps S1307 and S1308, when receiving the start request from the configuration server 10, the VPN relay device 13 performs a start process to start, for example, the relay controller 521 and the VPN relay 522 and sends a start report to the configuration server 10.

At step S1309, the configuration information transmitter 514 of the configuration server 10 identifies an IP address of the VPN termination device 100a by using the termination device ID of the VPN termination device 100a included in the connection request and the device information 516c.

At step S1310, the configuration information transmitter 514 of the configuration server 10 sends configuration information for the first VPN communication 4 to the VPN termination device 100a via, for example, the second VPN communication 3.

At step S1311, the VPN termination device 100a performs, for example, steps S712 through S714 in FIG. 7. In response, the first VPN communication unit 504 of the VPN termination device 100a sends a VPN connection request for a connection via the first VPN communication 4 to the VPN relay device 13.

At step S1312, the first VPN communication 4 is established between the first VPN communication unit 504 of the VPN termination device 100a and the relay controller 521 of the VPN relay device 13 according to a predetermined protocol.

At step S1313 of FIG. 14, the configuration information transmitter 514 of the configuration server identifies the dedicated VPN termination devices 100b and 100c corresponding to a tenant such as a company to which the user belongs by referring to the user information 516a and the tenant information 516b. In this example, it is assumed that two termination device IDs are stored in advance in "termination device ID (dedicated)" corresponding to the tenant ID, e.g., the tenant ID "T0002" in the tenant information 516b illustrated in FIG. 6B. Also, the configuration information transmitter 514 identifies the IP addresses of the dedicated VPN termination devices 100b and 100c corresponding to the tenant such as a company to which the user belongs by referring to the device information 516c.

At step S1314, the configuration information transmitter 514 of the configuration server 10 sends configuration information for the first VPN communication 4 to the VPN termination device 100b via the second VPN communication 3.

At step S1315, the first VPN communication unit 504 of the VPN termination device 100b sends a VPN connection request for a connection via the first VPN communication 4 to the VPN relay device 13.

At step S1316, the first VPN communication 4 is established between the first VPN communication unit 504 of the VPN termination device 100b and the relay controller 521 of the VPN relay device 13 according to a predetermined protocol.

At step S1317, the configuration information transmitter 514 of the configuration server 10 sends configuration information for the first VPN communication 4 to the VPN termination device 100c via the second VPN communication 3.

At step S1318, the first VPN communication unit 504 of the VPN termination device 100c sends a VPN connection request for a connection via the first VPN communication 4 to the VPN relay device 13.

At step S1319, the first VPN communication 4 is established between the first VPN communication unit 504 of the VPN termination device 100c and the relay controller 521 of the VPN relay device 13 according to a predetermined protocol.

At step S1320, the information manager 512 of the configuration server 10 updates the tenant information 516b as illustrated in FIG. 6B.

The above process enables the VPN termination device 100a, the VPN termination device 100b, and the VPN termination device 100c to communicate with each other via the first VPN communication 4 through the VPN relay device 13.

For example, VPN data transmitted at step S1401 by the VPN termination device 100a via the first VPN communication 4 is forwarded by the VPN relay device 13 to the VPN termination device 100b and the VPN termination device 100c at steps S1402 and S1403.

The above process enables the user to perform the first VPN communication 4 with multiple sites B and C of, for example, a company to which the user belongs by using the shared VPN termination device 100a installed in the site A.

As described above, the embodiments of the present invention make it easier to prevent the occurrence of a loop in the network in the communication system 1 where the configuration server 10 sets configuration information of multiple VPN termination devices 100 via the network.

Also, the embodiments of the present invention enable the configuration server 10 to securely set the configuration information of multiple VPN termination devices 100 via the second VPN communication 3.

Figure 15:
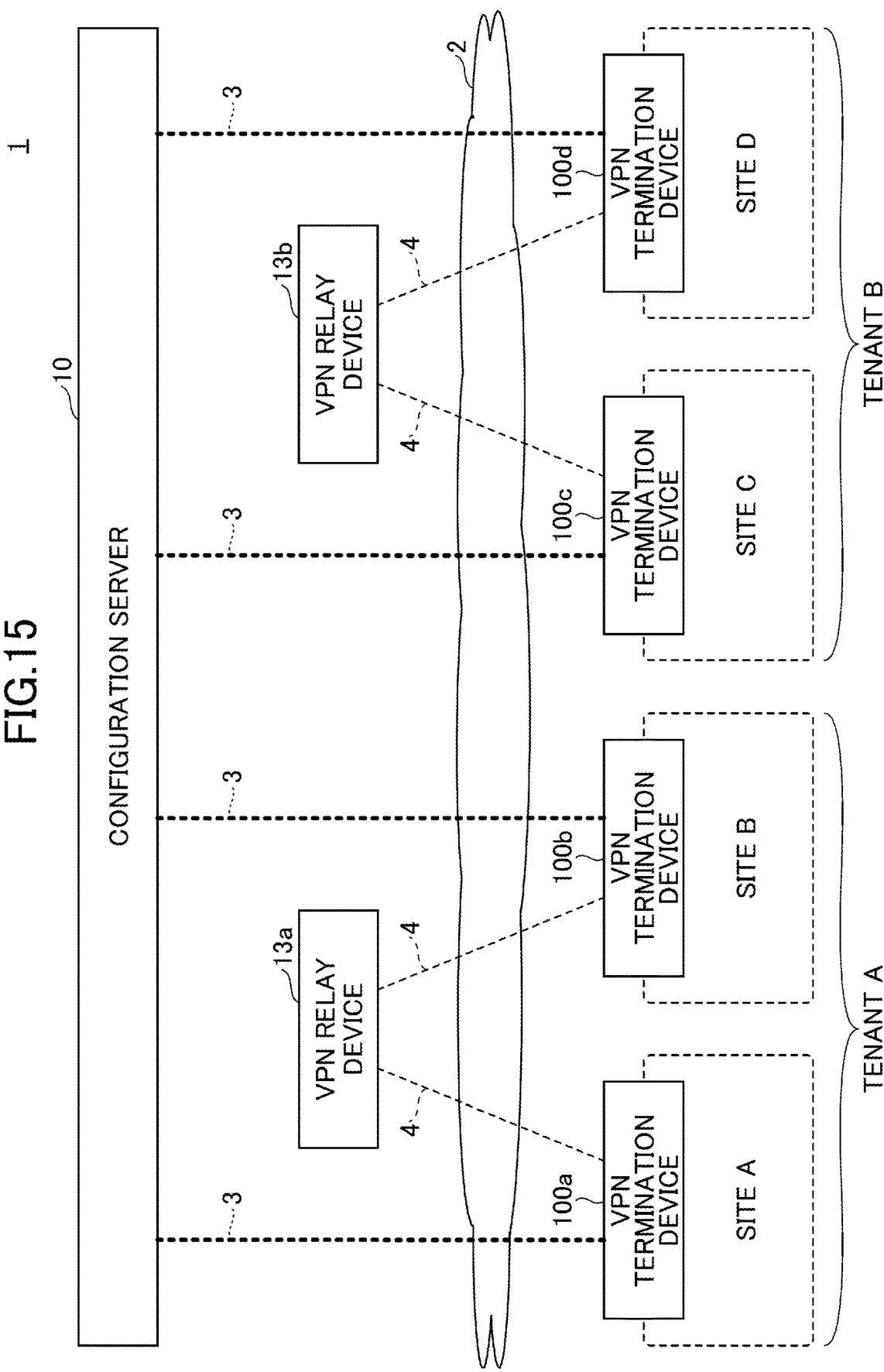
FIG. 15 is a drawing illustrating another example of a system configuration of a communication system according to an embodiment.

In the above embodiments, it is assumed that the number of tenants is one. However, the communication system 1 may include multiple tenants (e.g., a tenant A and a tenant B) as illustrated in FIG. 15. In this case, it is preferable that the communication system 1 includes VPN relay devices 13a and 13b dedicated for the respective tenants.

In the example of FIG. 15, when the first VPN communication 4 is performed from the shared VPN termination device 100a in the site A to the dedicated VPN termination device 100b in the site B, the VPN relay device 13a dedicated for the tenant A is used. Also, when the first VPN communication 4 is performed from the shared VPN termination device 100c in a site C to the dedicated VPN termination device 100d in a site D, the VPN relay device 13b dedicated for the tenant B is used.

Supplementary Descriptions of Embodiments

Each of the functional components described in the above embodiments may be implemented by one or more processing circuits. In the present application, the term "processing circuit" may indicate a processor that is implemented by an electronic circuit and programmed by software to implement various functions, or a device such as an application specific integrated circuit (ASIC), a digital signal processor (DSP), a field programmable gate array (FPGA), or a circuit module designed to implement the functions described above.

Also, the devices described above merely indicate one of multiple computing environments for implementing the embodiments described in the present application.

In one embodiment, the configuration server 10 may include multiple computing devices, e.g., a server cluster. The multiple computing devices may be configured to communicate with each other via a communication link such as a network or a shared memory and perform processes disclosed in the present application. Similarly, each of the VPN relay device and the VPN termination device 100 may include multiple computing devices configured to communicate with each other.

Also, the VPN configuration device 11 and the parent VPN termination device 12 illustrated in FIG. 1 may be configured to share the processes of the configuration server 10 illustrated in FIGS. 7-9, 11, 13, and 14 in various combinations. For example, a process performed by a given unit may be performed by the VPN configuration device 11. Similarly, a function of a given unit may be performed by the parent VPN termination device 12. Further, components of the configuration server 10 may be implemented by one server device or may be distributed to multiple devices.

A communication system, a VPN termination device, and a storage medium according to embodiments of the present invention are described above. However, the present invention is not limited to the specifically disclosed embodiments, and variations and modifications may be made without departing from the scope of the present invention.

What is claimed is:

1. A communication system, comprising:
multiple VPN termination devices that perform a first VPN communication; and
a configuration server that controls configuring of the first VPN communication,
wherein each of the multiple VPN termination devices includes a first processor programmed to implement:
a configuration information receiver of a virtual parent client deployed on the VPN termination device that has root authority that receives encrypted configuration information sent from the configuration server, the encrypted configuration information being for the first VPN communication,
the virtual parent client decrypting the encrypted configuration information and providing the decrypted configuration information to a virtual child client deployed on the VPN termination device that does not have root authority;
a communication controller of the virtual child client that configures the first VPN communication based on the decrypted configuration information; and
a first VPN communication unit of the virtual child client that performs the first VPN communication with another one of the multiple VPN termination devices according to the configuring performed by the communication controller, wherein the virtual parent client is configured to pass data to the virtual child client, the virtual child client is configured not to pass data to the virtual parent client, and data is blocked from being sent by the VPN termination device to the configuration server.

2. The communication system as claimed in claim 1, wherein
the configuration server includes a second processor programmed to implement a second VPN communication unit that communicates with the multiple VPN termination devices via a second VPN communication different from the first VPN communication; and
the configuration information receiver receives the encrypted configuration information via the second VPN communication.

3. The communication system as claimed in claim 2, wherein the second processor of the configuration server is programmed to also implement
a receiver that receives a connection request for the first VPN communication,
an information manager that manages information on the multiple VPN termination devices performing the first VPN communication and information on a VPN relay device that relays the first VPN communication, and
a configuration information transmitter that transmits the encrypted configuration information to the multiple VPN termination devices based on the connection request and the information managed by the information manager.

4. The communication system as claimed in claim 3, wherein
the encrypted configuration information includes connection information for connection with the VPN relay device that relays the first VPN communication; and
the first VPN communication unit establishes the first VPN communication with the VPN relay device by using the connection information.

5. The communication system as claimed in claim 3, wherein
the communication system includes the VPN relay device; and
the VPN relay device includes a third processor programed to implement
a relay controller that establishes the first VPN communication with the multiple VPN termination devices based on requests from the multiple VPN termination devices, and
a VPN relay that transfers data transmitted by one of the multiple VPN termination devices to another one of the multiple VPN termination devices.

6. The communication system as claimed in claim 1, wherein the first processor of each of the multiple VPN termination devices is programmed to also implement a client controller that starts the configuration information receiver with the virtual parent client having the root authority and starts the communication controller and the first VPN communication unit with the virtual child client that does not have the root authority.

7. The communication system as claimed in claim 1, wherein
the multiple VPN termination devices include a dedicated VPN termination device used by a group to which a user requesting a connection for the first VPN communication belongs and a shared VPN termination device used by users belonging to the group; and
the communication system further comprises an information terminal that is connected to the shared VPN termination device and used by the user requesting the connection for the first VPN communication to perform the first VPN communication with a site connected to the dedicated VPN termination device.

8. A VPN termination device for a communication system including multiple VPN termination devices that perform a first VPN communication and a configuration server that controls configuration of the first VPN communication, the VPN termination device comprising:
a processor programmed to implement:
a configuration information receiver of a virtual parent client deployed on the VPN terminal device that has root authority that receives encrypted configuration information sent from the configuration server, the encrypted configuration information being for the first VPN communication,
the virtual parent client decrypting the encrypted configuration information and providing the decrypted configuration information to a virtual child client deployed on the VPN termination device that does not have root authority;
a communication controller of the virtual child client that configures the first VPN communication based on the decrypted configuration information; and
a first VPN communication unit of the virtual child client that performs the first VPN communication with another VPN termination device of the multiple VPN termination devices according to the configuring performed by of the communication controller, wherein the virtual parent client is configured to pass data to the virtual child client, the virtual child client is configured not to pass data to the virtual parent client, and data is blocked from being sent by the VPN termination device to the configuration server.

9. A non-transitory computer-readable storage medium storing a program for causing a VPN termination device for a communication system, which includes multiple VPN termination devices that perform a first VPN communication and a configuration server that controls configuring of configures the first VPN communication, to execute a process including:
receiving, at a configuration information receiver of a virtual parent client deployed on the VPN termination device that has root authority, encrypted configuration information sent from the configuration server, the encrypted configuration information being for the first VPN communication,
the virtual parent client decrypting the encrypted configuration information and providing the decrypted configuration information to a virtual child client deployed on the VPN termination device that does not have root authority;
configuring, by a communication controller of the virtual child client, the first VPN communication based on the decrypted configuration information; and
performing, by a first VPN communication unit of the virtual child client, the first VPN communication with another VPN termination device of the multiple VPN termination devices according to the configuring performed by the communication controller wherein the virtual parent client is configured to pass data to the virtual child client, the virtual child client is configured not to pass data to the virtual parent client, and data is blocked from being sent by the VPN termination device to the configuration server.

* * * * *